(12) United States Patent
Hasegawa et al.

(10) Patent No.: US 7,048,809 B2
(45) Date of Patent: May 23, 2006

(54) MAGNETIC IMPLEMENT HAVING A LINEAR BH LOOP

(75) Inventors: Ryusuke Hasegawa, Morristown, NJ (US); Vincent H. Hammond, Beavercreek, OH (US); James M. O'Reilly, Pittsford, NY (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 10/348,075

(22) Filed: Jan. 21, 2003

(65) Prior Publication Data

US 2004/0140015 A1   Jul. 22, 2004

(51) Int. Cl.
*H01F 1/04* (2006.01)

(52) U.S. Cl. ............... 148/315; 148/302; 148/306; 148/311; 148/312; 252/62.54

(58) Field of Classification Search ............ 252/62.54; 148/302, 306, 311, 312, 315
See application file for complete search history.

(56) References Cited

U.S. PATENT DOCUMENTS

| 3,661,556 | A | * | 5/1972 | Jolley et al. | 75/349 |
| 3,966,510 | A | * | 6/1976 | Aonuma et al. | 148/105 |
| 4,007,072 | A | * | 2/1977 | Aonuma et al. | 148/105 |
| 4,217,152 | A | * | 8/1980 | Aonuma et al. | 148/108 |
| 6,028,422 | A | | 2/2000 | Preusse | 323/357 |
| 6,144,279 | A | | 11/2000 | Collins et al. | 336/178 |
| 6,160,697 | A | | 12/2000 | Edel | 361/143 |
| 6,507,262 | B1 | | 1/2003 | Otte et al. | 336/213 |

OTHER PUBLICATIONS

International Search Report (in English) for International application No. PCT/US04/01018, dated Jun. 28, 2005.
Written Opinion (in English) of the International Searching Authority mailed Jun. 28, 2005.

* cited by examiner

*Primary Examiner*—John P. Sheehan

(57) ABSTRACT

Magnetic powder having a large coercivity, $H_c$, is consolidated with a non-magnetic binder to form a magnetic implement having desired dimension and shape. The magnetic implement exhibits a linear B-H loop and low magnetic loss. It is capable of operating under a wide magnetic field range, and finds use current and pulse transformers, inductors carrying large electrical current, stable bandpass filters, and the like.

10 Claims, 3 Drawing Sheets

MAGNETIC IMPLEMENT HAVING A LINEAR BH LOOP

BACKGROUND OF THE INVENTION

1. Field of the Invention

This invention relates to magnetic components for use in sensors, transformers, electrical chokes, magnetic inductors and the like; and more particularly to a magnetic implement that exhibits linear magnetization in response to an applied magnetic field.

2. Description of the Prior Art

When a magnetic material is magnetized by an external magnetic field, "H", a magnetic polarization or induction takes place in the material. The amount of the induction is measured as magnetic flux density, commonly termed "B". A linear B-H characteristic is generally obtained for a soft magnetic material in which the magnetically easy axis lies perpendicular to the direction of the magnetic excitation. In such material, the external magnetic field H tends to tilt the average direction of the magnetic flux B so that the measured quantity B is proportional to H. Since the ideal linear B-H response is not easily achieved, most magnetic materials display non-linear B-H behavior. Any deviation from an ideal B-H linearity introduces corresponding deviations in the magnetic response to the externally applied field H.

A classical example of magnetic materials showing linear B-H characteristics is a cold-rolled 50% Fe—Ni alloy, called Isoperm. Among amorphous magnetic alloys, heat-treated Co-rich alloys have been known to provide linear B-H characteristics and are presently used as the magnetic core materials in current transformers. The Co-rich amorphous alloys in general have saturation inductions lower than about 10 kG, or 1 Tesla, which limits the maximum field levels that can be applied. A recent development has led to an Fe-based amorphous alloy that shows a linear B-H behavior when properly heat-treated. Such an Fe-based amorphous alloy and its heat treatment are disclosed by U.S. Pat. No. 6,749,695. This Fe-based material exhibits a saturation induction exceeding 10 kG or 1 Tesla, thereby extending the use of the linear B-H behavior into a higher magnetic excitation region.

Further extension of the B-H linear behavior to an even higher magnetic field is necessary to address the needs of magnetic devices operated in larger applied fields. These needs arise from the ever-increasing level of electrical current, which must be controlled or monitored in electrical power devices and power electronics. In the case of sensors, a high field capability would extend the upper current limit of existing devices. Magnetic materials that possess linear B-H behaviors are clearly needed by devices exposed to wider magnetic field excitation.

SUMMARY OF THE INVENTION

The present invention provides a magnetic implement having in combination a linear BH loop and low magnetic loss. When used in a pulse transformer, the increased B-H linear region of the implement makes it possible to offset a large DC component in the transformer. Use of the implement in a bandpass filter circuit, significantly improves the circuit's frequency stability.

In addition, this invention provides a method for fabricating a magnetic implement having in combination a linear B-H loop and low magnetic loss. The implement is composed of a magnetic powder having a large coercivity, $H_c$. Such magnetic powder is consolidated with a non-magnetic binder into a final implement having desired dimension and shape. As used herein, the coercivity, $H_c$, of the powder is defined as ½ of the width of the BH loop of the selected magnetic powder. The implement should be capable of operating under as wide a magnetic field as possible. Accordingly, high coercivity powders are desired. Magnetic powders suitable for use with the present invention range from semi-hard to hard powders. They include rare-earth transition metal-based magnets. Magnetic implements prepared in accordance with the method of this invention are especially suited for use in devices requiring a linear B-H response to a magnetic field, such as current and pulse transformers, inductors carrying large electrical current, and stable bandpass filters.

BRIEF DESCRIPTION OF THE DRAWINGS

The invention will be more fully understood and further advantages will become apparent when reference is had to the following detailed description and the accompanying drawings, in which.

DETAILED DESCRIPTION OF THE INVENTION

Figure 2:
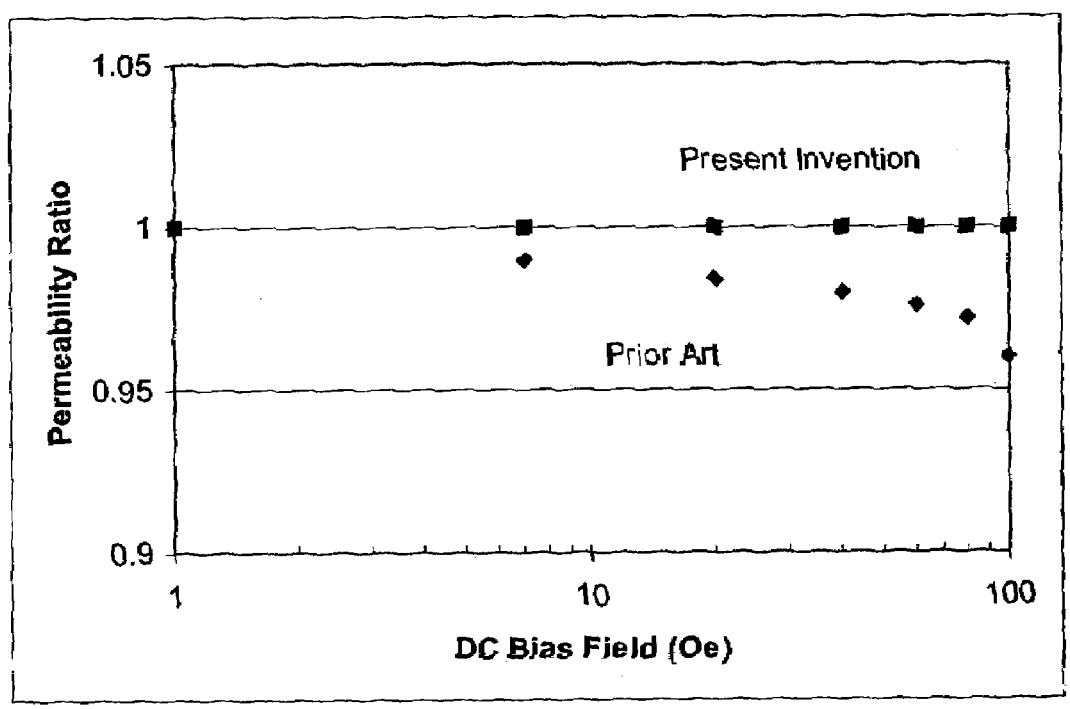
FIG. 2 is a graph comparing the permeability ratio versus DC bias curves for the ring-shaped core of FIG. 1 and a conventional core composed of Molybdenum Permalloy powder.
Figure 3:
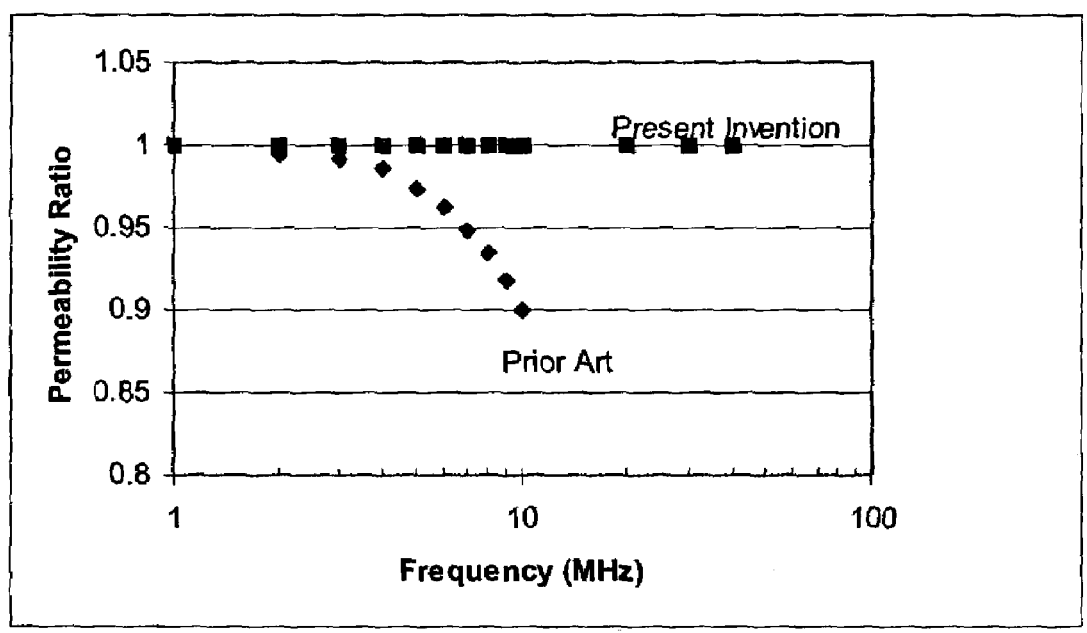
FIG. 3 is a graph comparing the permeability ratio versus frequency for the ring-shaped core and the Molybdenum Permalloy powder-based core of FIG. 2.

Introduction of magnetic gaps in a magnetic material tends to shear the shape of the BH loop and sometimes results in a linear BH loop. The magnetic gaps can be provided by the non-magnetic binder in a consolidated magnetic powder product. FIGS. 2 and 3, described hereinafter in greater detail, contrast a conventional core that has been produced in this manner with a core produced in accordance with the present invention.

Magnetic powder suitable for use in the present invention can be produced from salt solutions containing magnetic elements, including Fe, Co, and Nd, where Fe is, optionally, replaced up to about 10 at. % Ni and Nd is, optionally, replaced by Pr and/or Sm. The magnetic powder is then consolidated with epoxy resin and fabricated into the magnetic cores of the present invention. Consolidation is, optionally, achieved using other polymers, including polyurethane, polyimide, high-performance polymers and hybrids thereof. The magnetic cores thus produced exhibit linear B-H magnetic responses.

Figure 1:
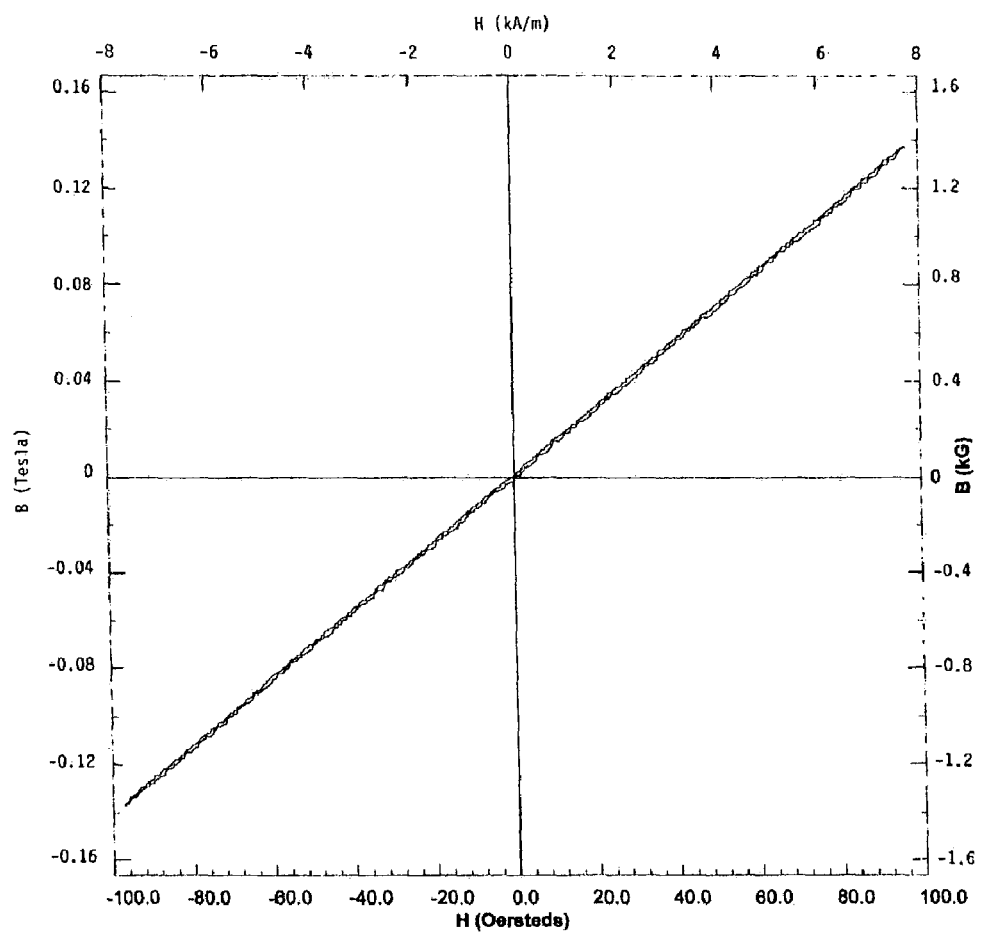
FIG. 1 is a graph depicting the B-H magnetic response of a toroidally shaped magnetic ring of the present invention.

In FIG. 1 there is shown, a typical B-H loop taken on Sample C of Example 1. The B-H loop exhibits a linear BH behavior with a DC permeability of about 14. FIG. 2 compares the permeability versus DC bias curves for Sample C and a conventional core composed of Molybdenum Permalloy powder that also has a DC permeability of about 14. It is clear from FIG. 2 that the permeability of the core of the present invention does not change with a DC bias level approaching 100 Oe, whereas the permeability of the conventional core starts to decrease noticeably for a DC bias field above about 10 Oe. The upper limit for the constant permeability as a function of the DC bias field increases with the coercivity $H_c$ of the magnetic powder used. A powder coercivity exceeding about 20 Oe is desirable to obtain BH linearity for a reasonably wide range of applied field. Powder having a higher saturation magnetization, i.e. exceeding about 35 emu/g, is also desirable, as it extends the linear BH behavior. When the magnetic excitation frequency was raised to above the 10 MHz region, the linear BH behavior of the core depicted by FIG. 1 remained unchanged.

FIG. 3 compares the frequency dependence of the core permeability for a conventional core and a core constructed in accordance with the present invention. The data for the conventional magnetic implement ranges up to 10 MHz. Permeability of the magnetic implement of the present invention remains unchanged up to 40 MHz, which is the upper limit of the instrument used. These features illustrate the considerable advantage afforded by cores of the present invention over conventional magnetic implements. When compared with conventional cores, the magnetic implement of the invention is able to accommodate a larger current in an inductor core. An inductor constructed in accordance with the present invention works well beyond the excitation frequency of 10 MHz, at which a conventional implement loses its effectiveness. In combination, the presence of these features in the magnetic implements of the present invention, permit their application in a broad array of magnetic devices, such as inductors in electrical power devices, power electronics, sensors, and bandpass filters having improved performance.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Example 1

Fe—Co-based Powder Cores

Powder used to fabricate core samples A, B, and C is produced by borohydride reduction of a 100% $FeSO_4$ salt solution, a 65% $FeSO_4$/35% $CoCl_2$ salt solution, and a 50% $FeSO_4$/50% $CoCl_2$ salt solution, respectively. The powder is then fabricated into ring-shaped magnetic implements, using epoxy resin. Such ring-shaped cores have a dimension of OD=25.5 mm, ID=13.0 mm, and Height=1.3 mm. The properties of the powder and the resultant magnetic cores are listed in Table 1 below:

TABLE 1

| Core Sample | Powder Chemistry (Wt. %) | Saturation Magnetization (emu/g) | Coercivity $H_c$(Oe) | Volume Fraction of Powder (%) | DC Permeability |
|---|---|---|---|---|---|
| A | $Fe_{95.3}B_{11.8}O_9$ | 135 | 380 | 83 | 14 |
| B | $Fe_{50.4}Co_{27.7}B_{6.6}O_{8.9}$ | 120 | 510 | 79 | 11 |
| C | $Fe_{35.6}Co_{37.2}B_{6.9}O_{12.9}$ | 92 | 620 | 84 | 14 |

Each of samples A, B, and C exhibit a linear BH behavior up to 100 Oe, which is the upper limit for the core-coil assembly adopted in this Example.

The permeability of the cores in Table 1 does not change up to the upper frequency limit (40 MHz) of the inductance bridge used.

Example 2

Fe—Nd—B-based Powder Cores

The powder used in the fabrication of core samples D and E is produced from a 85%/15% $FeSO_4$/$NdCl_2$ salt solution and a 72%/28% $FeSO_4$/$NdCl_2$ salt solution, respectively. Such powder is then consolidated into ring-shaped magnetic implements, using epoxy resin. The ring-shaped cores have a dimension of: OD=24.2 mm, ID=12.0 mm and Height=1.5 mm. Properties of the powder and the resultant magnetic cores are listed in Table 2 below:

TABLE 2

| Core Sample | Powder Chemistry (Wt. %) | Saturation Magnetization (emu/g) | Coercivity $H_c$(Oe) | Volume Fraction of Powder (%) | DC Permeability |
|---|---|---|---|---|---|
| D | $Fe_{36.9}Nd_{19.1}B_{5.9}O_{24.5}$ | 39 | 30 | 75.9 | 13 |
| E | $Fe_{24.6}Nd_{27.1}B_{6.8}O_{25.5}$ | 41 | 20 | 81.5 | 13 |

Both core samples, D and E, show linear BH behavior up to an applied field of about 80 Oe, which is the upper limit for the core-coil assembly adopted in this Example.

The permeability of the cores in Table 2 does not change up to the upper frequency limit (40 MHz) of the inductance bridge used.

Example 3

Sample Preparation

Fe—Co—B and Fe—Nd—B alloy nanoparticles are produced through the chemical reduction of aqueous metal salt solutions. For the Fe—Co—B powders, a 0.1M salt solution is prepared by adding the necessary amount of metal salts ($FeSO_4$ and $CoCl_2$) to 400 mL distilled water. The amount of $FeSO_4$ and $CoCl_2$ used in the solution is varied over a range of Fe/Co percentages from 50/50 to 100/0 to produce powders of varying composition. For the Fe—Nd—B powders, 250 mL salt solutions with Fe/Nd percentages of 72/28 and 85/15 is prepared using $FeSO_4$ and $NdCl_2$. A 0.4M borohydride solution is prepared by dissolving 3.78 g of $NaBH_4$ in 250 mL distilled water, which is then dropwise added over approximately 30 minutes to the salt solution. Stirring is maintained throughout the addition of the borohydride solution using a magnetic stirring plate and stir-bar.

A black precipitate quickly forms upon the addition of the borohydride solution to the Fe—Co solutions. However, the onset of precipitation is much slower in the Fe—Nd solutions, with as much as 20 mL borohydride solution required to initiate the formation of fine precipitates. Upon completion of the reaction, the powder is washed with water, followed by acetone, and then dried in vacuum for 24 hours. After drying, the passivated powders are stored in a vacuum desiccator to minimize additional oxygen exposure. The typical powder yield is approximately 3 grams. The typical powder was in nanometer sizes.

Composite rings are fabricated using selected Fe—Co—B and Fe—Nd—B nano size powders by adding the desired amount of epoxy resin to approximately 1 gram of powder. Acetone is then added to create a slurry that is vigorously stirred to achieve uniform distribution of the polymer throughout the powder. After drying, a ring with approximate 25 mm outer diameter and 12.5 mm inner diameter is produced by cold-pressing the polymer-coated powder in a compression mold to 22 MPa, followed by curing of the polymer at 121° C. for 3 hours. The epoxy/powder nanocomposites had an approximate powder content of 80% by weight.

Magnetic Measurements

The intrinsic magnetic properties of the magnetic powder produced in accordance with Example 3 are measured by a conventional vibrating sample magnetometer. Saturation magnetization and coercivity data adduced by these measurements are set forth in Tables 1 and 2.

A ring-shaped magnetic implement in accordance with Example 3 is tested in a conventional B-H hysteresigraph to obtain B-H characteristics. FIG. 1 provides one such example. The magnetic permeability, defined as B/H, is measured on the ring-shaped cores as a function of DC bias field and frequency. FIG. 2 depicts the permeability versus DC bias field for a core of the present invention and a conventional core. Both of these cores have a DC permeability of about 14 at zero bias field.

An inductance bridge is used to measure permeability versus excitation frequency up to 40 MHz. FIG. 3 shows one such example.

X-ray and Thermal Measurements

A conventional x-ray diffractometer is used to determine atomic structures of the powder materials. The results indicate that the powders produced in accordance with the teaching of Example 3 are predominantly amorphous, although the powder of Sample A has some crystallinity. A differential scanning calorimeter is used to confirm the x-ray measurement results. Such results show that primary crystallization takes place at about 480° C. for the powders of Samples A, B and C, and 625° C. for the powders of Samples D and E.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A magnetic implement fabricated by mixing, with a non-magnetic binder, nanosized magnetic powder produced by borohydride reduction of a salt solution containing magnetic elements comprised of Fe, Co, and Nd, having approximately 10 at. % Fe replaceable by Ni and having Nd which is replaceable by Pr and/or Sm, said implement having a linear B-H characteristic over a magnetic field range exceeding 10 Oe and a frequency range exceeding 10 MHz.

2. A magnetic implement as recited by claim 1, wherein said salt solution comprises $FeSO_4$, $CoCl_2$, and $NdCl_2$.

3. A magnetic implement as recited by claim 1, wherein said powder is composed of at least one of the element combinations Fe—Nd—B, Fe—Co—B and Fe—B, wherein Fe can be replaced by up to about 10 at. % Ni, and Nd can be replaced by Sm or Pr.

4. A magnetic implement as recited by claim 1, wherein said powder has a saturation magnetization exceeding 35 emu/g and a coercivity exceeding about 20 Oe.

5. A magnetic implement as recited by claim 1, wherein said powder has an amorphous structure.

6. A magnetic implement as recited by claim 2, wherein said powder comprises a mixture of powders having amorphous and crystalline structures.

7. A magnetic implement as recited by claim 1, wherein said powder has a crystalline structure.

8. A magnetic implement as recited by claim 1, wherein said non-magnetic binder is epoxy resin, polyurethane, polyimide, high-perfomance polymers, and hybrids thereof being mixed with said powder and acetone followed by drying and cold-pressing of resultant polymer-coated powder prior to curing said polymer/magnetic powder composites.

9. A magnetic implement as recited by claim 1, wherein said linear B-H characteristic is present during application of an applied magnetic field reaching 100 Oe.

10. A magnetic implement as recited by claim 1, wherein said linear B-H characteristic is present for an excitation frequency reaching 40 MHz.

* * * * *

UNITED STATES PATENT AND TRADEMARK OFFICE
CERTIFICATE OF CORRECTION

PATENT NO. : 7,048,809 B2  Page 1 of 1
APPLICATION NO. : 10/348075
DATED : May 23, 2006
INVENTOR(S) : Ryusuke Hasegawa et al.

It is certified that error appears in the above-identified patent and that said Letters Patent is hereby corrected as shown below:

Column 6, line 29, change "high-perfomance" to --high-performance--

Signed and Sealed this

Third Day of April, 2007

JON W. DUDAS
*Director of the United States Patent and Trademark Office*